(12) United States Patent
Hon

(10) Patent No.: US 6,827,518 B2
(45) Date of Patent: Dec. 7, 2004

(54) INNER-LOCK FOLDABLE JOINT

(76) Inventor: David T. Hon, No. 6, Lane 609, Chung Hsin Rd., Sec. 5, 8-2 Floor, San Chung, Taipei Hsien (TW)

( * ) Notice: Subject to any disclaimer, the term of this patent is extended or adjusted under 35 U.S.C. 154(b) by 33 days.

(21) Appl. No.: 10/606,740

(22) Filed: Jun. 27, 2003

(65) Prior Publication Data

US 2004/0190984 A1 Sep. 30, 2004

(51) Int. Cl.⁷ .............................................. E05D 11/10
(52) U.S. Cl. ........................................... 403/93; 16/324
(58) Field of Search ....................... 403/93, 92; 16/324, 16/325, 319, 321, 326, 331, 332, 345, 348

(56) References Cited

U.S. PATENT DOCUMENTS

| 3,696,788 A | * 10/1972 | Day et al. ................. 16/324 X |
| 3,879,146 A | * 4/1975 | Mayer ....................... 16/325 X |
| 6,523,223 B2 | * 2/2003 | Wang .......................... 16/324 |

* cited by examiner

Primary Examiner—John R. Cottingham
(74) Attorney, Agent, or Firm—Bacon & Thomas (57) ABSTRACT

An inner-lock foldable joint has two base plates. One side of each base plate is articulated with the other base plate by way of a hinge. When a user rotates a lever to lock the two base plates, a braking mechanism drives a latching block to move forward, and two flanges of the latching block are inserted into a groove within a depression on one or both of the base plates.

6 Claims, 8 Drawing Sheets

FIG. 12

INNER-LOCK FOLDABLE JOINT

BACKGROUND OF THE INVENTION

1. Field of the Invention

The present invention relates to an inner-lock foldable joint and, more particularly, to an inner-lock foldable joint used for connecting two bars together.

2. Description of Related Art

In general, a foldable joint is typically used on a foldable bicycle. Prior art foldable joints are usually articulated to one side of two base plates, and these two base plates are respectively connected to two bars. Furthermore, a locking device is placed externally to lock the two connected base plates, and in this manner the two bars are locked together. Since the joint is mounted on the bicycle frame, jolts while riding will place the joint under extreme external forces. To achieve a compact connecting lock with sufficient strength that is also easy to assemble, the prior art locking device has a large and complicated design. However, the design of modern foldable bicycles is becoming very exacting, and a huge joint seems too burdensome and even unaesthetic, and may even be hit accidentally by the user.

Therefore, it is desirable to provide an improved foldable joint to mitigate and/or obviate the aforementioned problems.

SUMMARY OF THE INVENTION

One objective of the present invention is to provide an inner-lock foldable joint used for connecting two stick bars together.

To achieve this objective, the inner-lock foldable joint of the present invention has two base plates respectively connected to two bars, one side of each base plate articulated by way of a hinge, the inner-lock foldable joint having two depressions disposed respectively in opposing sides of the two base plates; at least one groove along an edge of one of the depressions; at least one latching block moveably mounted in one of the depressions; and a braking mechanism attached to the latching block for driving the latching block into or out of the groove. When the latching block moves into the groove, the two base plates are in a locked state, and when the latching block moves out of the groove, the two base plates are in a unlatched state.

Other objectives, advantages, and novel features of the invention will become more apparent from the following detailed description when taken in conjunction with the accompanying drawings.

DETAILED DESCRIPTION OF THE PREFERRED EMBODIMENTS

Illustrative embodiments of the invention are described below. In the interest of clarity, not all features of an actual implementation are described in this specification.

The use of a letter in association with a reference number is intended to show alternative embodiments or examples of the item to which the reference number is connected.

Figure 1:
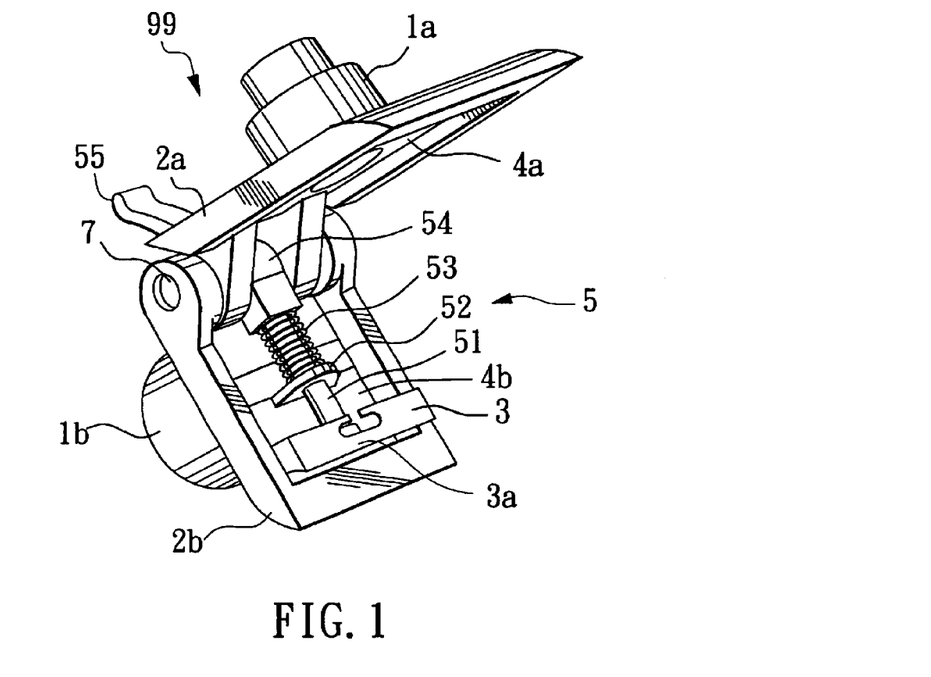
FIG. 1 is a perspective view of a first embodiment of an inner-lock foldable joint according to the present invention, which shows two base plates in an open condition.
Figure 2:
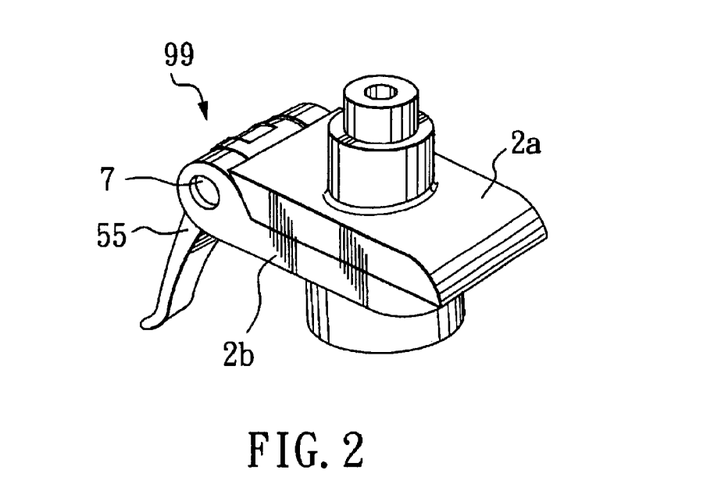
FIG. 2 is a perspective view of the first embodiment of the inner-lock foldable joint according to the present invention, which shows two base plates in a lock-up condition.
Figure 3:
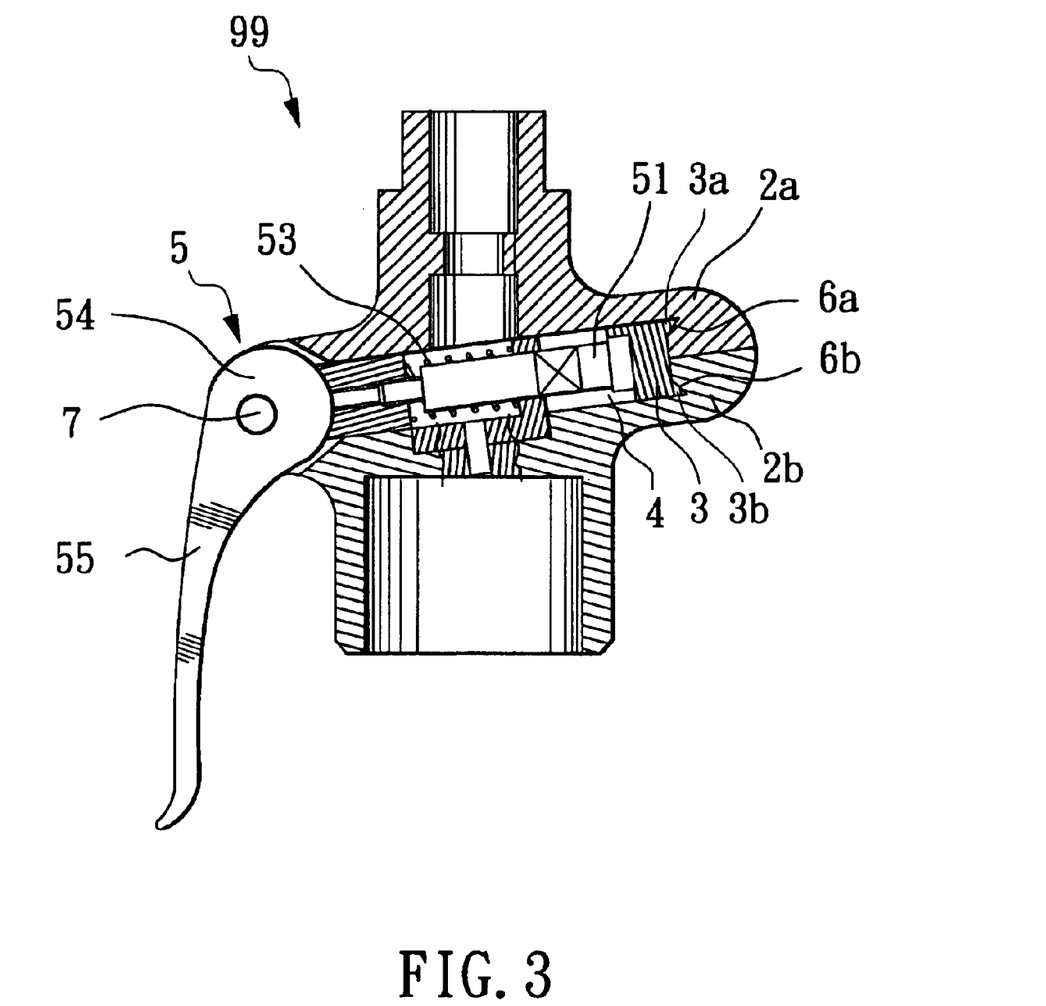
FIG. 3 is a cross-sectional drawing of the first embodiment of the inner-lock foldable joint according to the present invention.

Please refer to FIG. 1 to FIG. 3. In the present invention, an inner-lock foldable joint 99 comprises two base plates 2a, 2b; a latching block 3, and a breaking mechanism 5.

The two base plates 2a, 2b are respectively connected to two bars 1a, 1b, and one side of each base plate 2 is articulated with the other base plate 2 by way of a hinge 7, so the two base plates 2a, 2b can be in an open state as shown in FIG. 1, or in a closed state as shown in FIG. 2.

Two depressions 4a, 4b are separately present on opposing sides of the two base plates 2a, 2b, and two grooves 6a, 6b are disposed along corresponding edges of the two depressions 4a, 4b. Furthermore, a latching block 3 is moveably mounted in one of the depressions 4a, 4b, and in this embodiment is disposed in the depression 4b. One side of the latching block 3 comprises two flanges 3a, 3b. The two flanges 3a, 3b of the latching block 3 can be inserted into the grooves 6a, 6b of the two base plates 2a, 2b, which also means the shape of the two flanges 3a, 3b are matched to the shape of the grooves 6a, 6b.

The main purpose of the braking mechanism 5 is to move the latching block 3. By controlling the position of the latching block 3, the two base plates 2a, 2b can be in an open and unlatched condition, as shown in FIG. 1, or in a closed and latched condition as shown in FIG. 2.

In this embodiment, the braking mechanism 5 comprises a push rod 51, a stop plate 52, a reposition spring 53, an eccentric wheel 54 and a lever 55. One end of the eccentric wheel 54 is connected to one end of the lever 55. One end of the push rod 51 is connected to the latching block 3, and another end touches the eccentric wheel 54. The stop plate 52 is fixed on the depression 4b, and the reposition spring 53 is fixed on the push rod 51 between the stop plate 52 and the eccentric wheel 54. When the lever 55 is pressed down, the eccentric wheel 54 pushes the push rod 51 to move toward to the grooves 6a, 6b of two base plates 2a, 2b, so the two flanges 3a, 3b of the latching block 3 respectively insert into the grooves 6a, 6b of the two base plates 2a, 2b, as in the closed and latched state shown in FIG. 2 and FIG. 3. When the lever 55 is pulled up (the eccentric wheel 54 leaves the push rod 51), the reposition spring 53 pulls back the push rod 51 so the two flanges 3a, 3b of the latching block 3 leave the grooves 6a, 6b, as depicted in the open state shown in FIG. 1.

Figure 4:
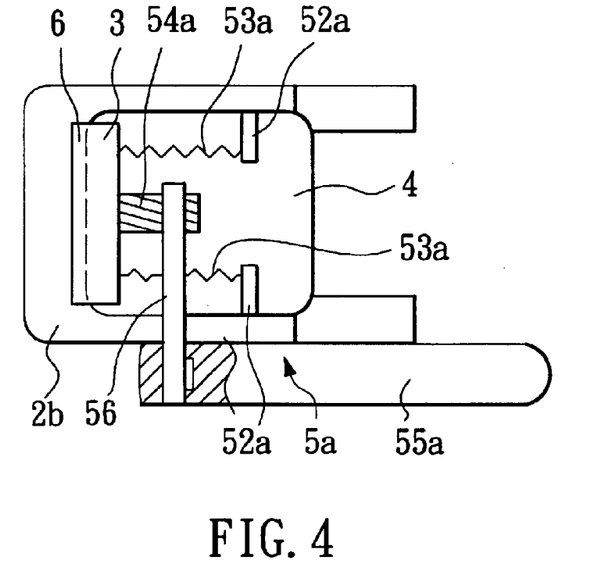
FIG. 4 is a structure schematic drawing of a second embodiment which shows a latching block moving into a groove.
Figure 5:
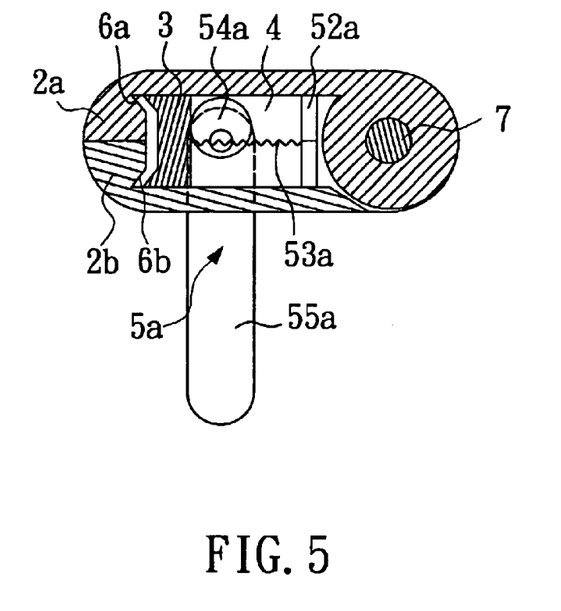
FIG. 5 is a cross-sectional drawing of the second embodiment which shows a latching block leaving the groove.

Please refer to FIG. 4 and FIG. 5. In a second embodiment, the operating principle is similar to that in the first embodiment, the only difference being that a breaking mechanism 5a in the second embodiment has a different structure. A lever 55a of the breaking mechanism 5a is placed on one side of the base plates 2a, 2b and is connected to the eccentric wheel 54 via a link rod 56. The eccentric wheel 54 pushes against the latching block 3. Furthermore, two reposition springs 53a are connected between two stop plates 52a and the latching block 3. By operating the lever 55a, the eccentric wheel 54a pushes the latching block 3 towards the grooves 6a, 6b, as shown in FIG. 4, or the reposition springs 53a pull the latching block 3 out of the grooves 6a, 6b, as shown in FIG. 5.

Figure 6:
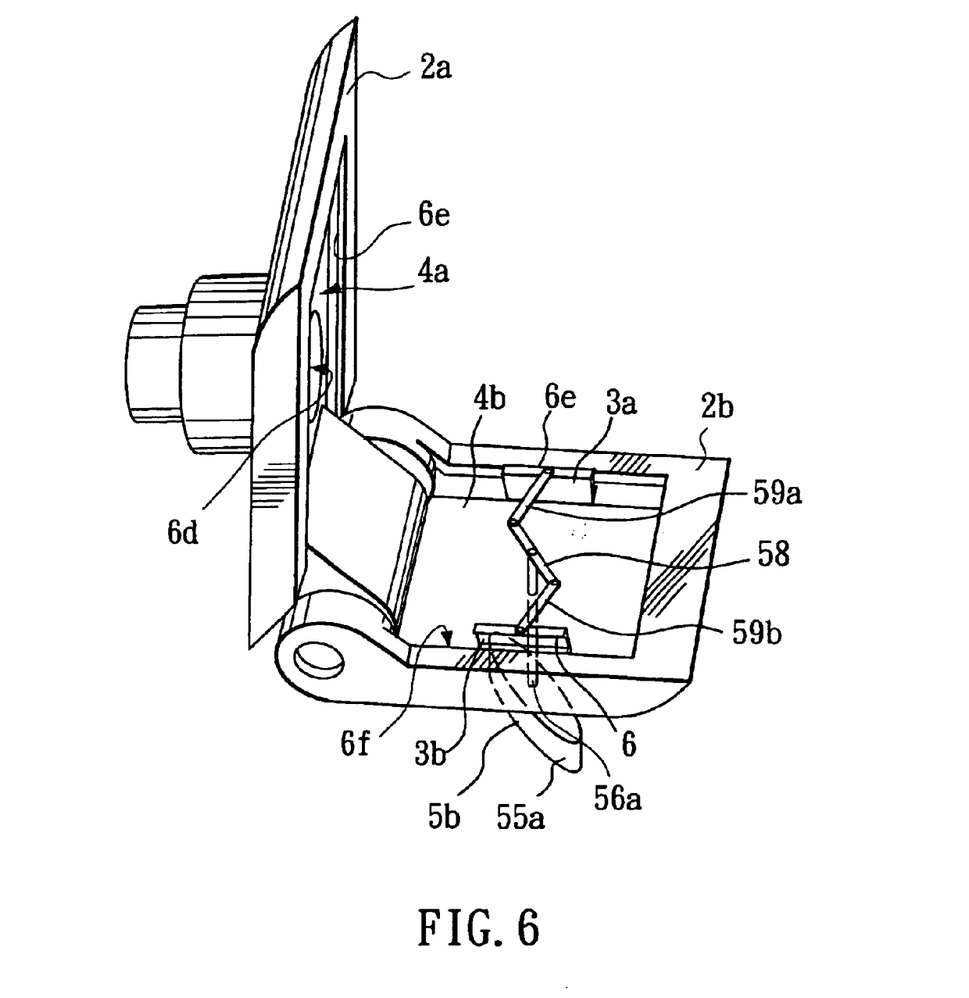
FIG. 6 is a perspective view of a third embodiment according to the present invention.
Figure 7:
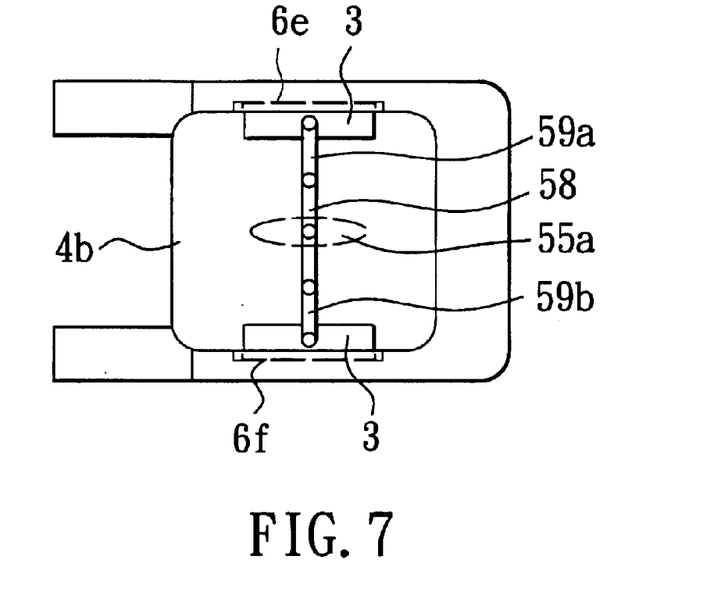
FIG. 7 is a structure schematic drawing of a third embodiment according to the present invention which shows a latching block moving into the groove.
Figure 8:
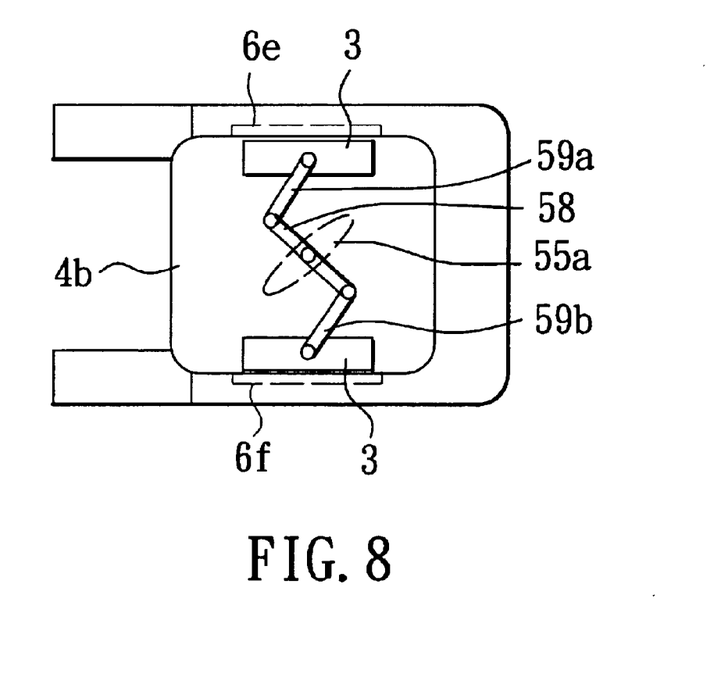
FIG. 8 is a structure schematic drawing of a third embodiment according to the present invention which shows a latching block leaving the groove.

Please refer to FIG. 6 to FIG. 8. A third embodiment utilizes the same operating principle as the other two embodiments with regards to the positional relationship between the latching block and the grooves to provide the latched and unlatched states. However, in the third embodiment, two grooves 6c, 6d are disposed along two sides of the base plate 2a, and two grooves 6e, 6f are disposed along two sides of the base plate 2b. Additionally, a breaking mechanism 5b is somewhat changed. A lever 55a of the breaking mechanism 5b is connected to a rotatable bar 58 via an axel 56a. Additionally, two link bars 59a, 59b are respectively connected to either end of the rotatable bar 58. The two link bars 59a, 59bare also connected by their other ends to two latching blocks 3a, 3b. When the user rotates the lever 55a, which causes the rotatable bar 58 and the two link bars 59a, 59b to line up in parallel, the two latching blocks 3a, 3b move into the grooves 6c, 6d, 6e, 6f, as shown in FIG. 7, or the two latching blocks 3a, 3b separate from the grooves 6c, 6d, 6e, 6f, as shown in FIG. 8.

Figure 9:
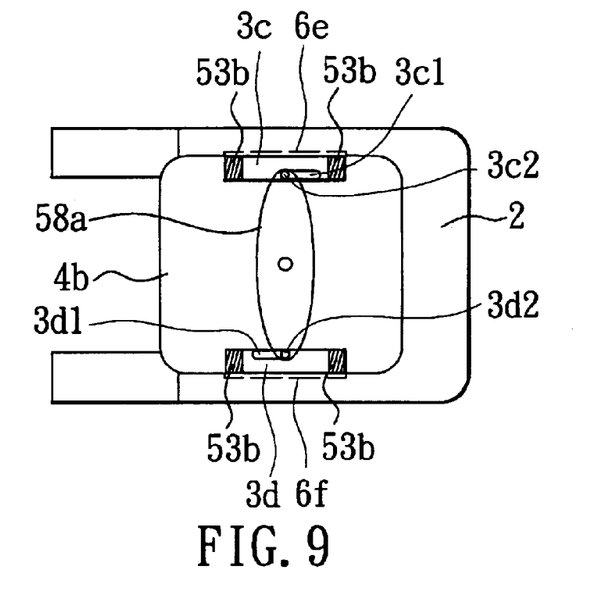
FIG. 9 is a structure schematic drawing of a fourth embodiment according to the present invention which shows a latching block moving into the groove.
Figure 10:
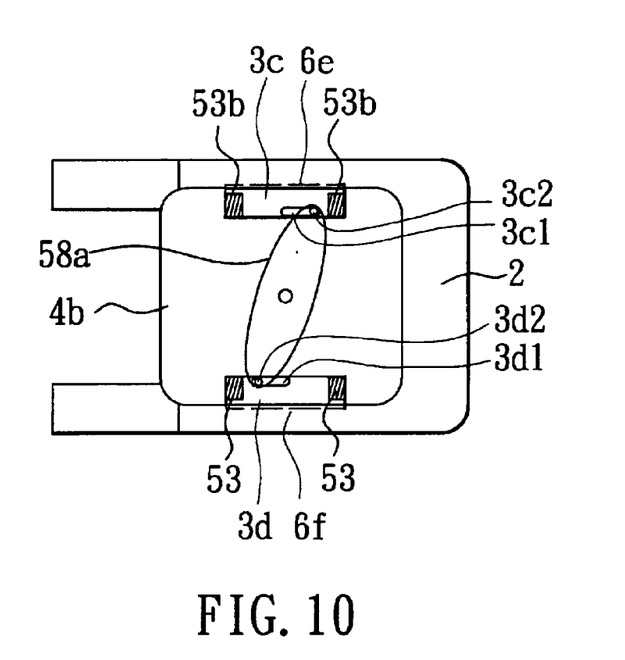
FIG. 10 is a structure schematic drawing of a fourth embodiment according to the present invention which shows a latching block leaving the groove.

Please refer to FIG. 9 and FIG. 10. A fourth embodiment continues to utilize the same operational principle of the other three embodiments. The fourth embodiment is similar to the third embodiment. Two latching blocks each have two guide troughs 3c1, 3d1 and two pins 3c2, 3d2, and two ends of the rotatable bar 58a are moveably connected to the two latching blocks 3c, 3d. When the user rotates the lever, the rotatable bar 58a and the latching blocks 3c, 3d are perpendicular to each other, and so the two latching blocks 3a, 3b move towards the grooves 6c, 6d, 6e, 6f, as shown in FIG. 9, or the two latching blocks 3a, 3b separate from the grooves 6c, 6d, 6e, 6f, as shown in FIG. 10.

Figure 11:
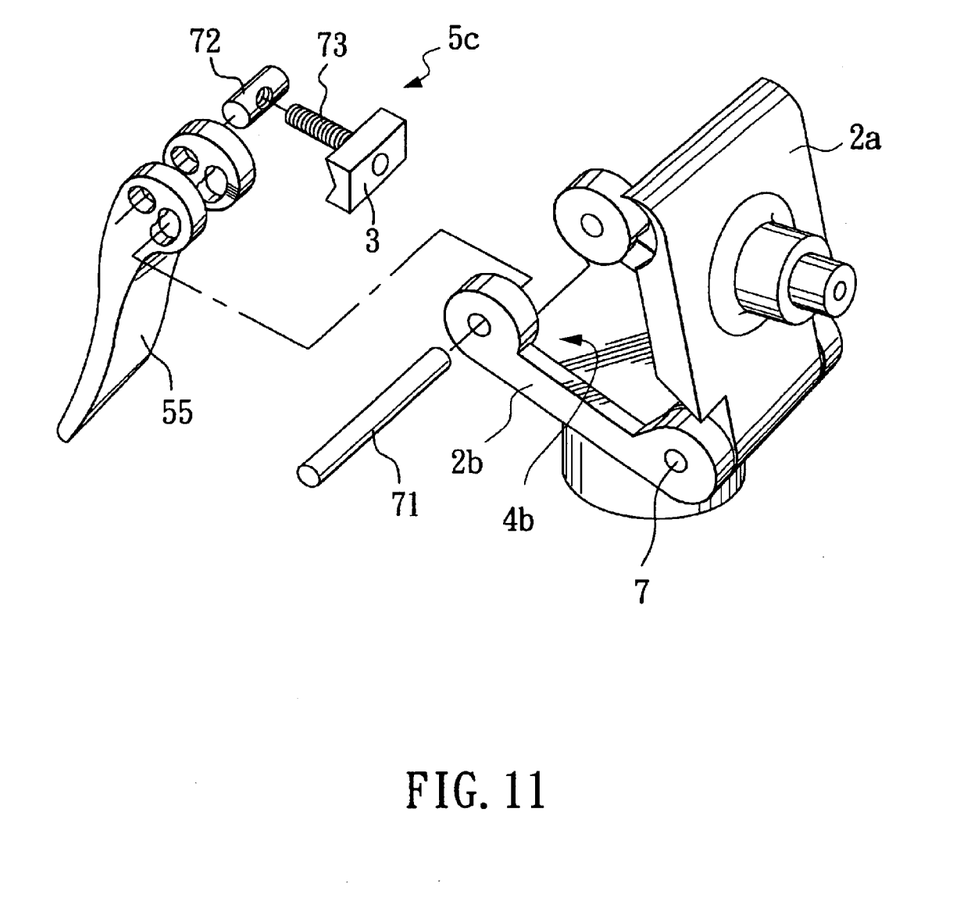
FIG. 11 is a perspective view of a fifth embodiment according to the present invention.
Figure 12:
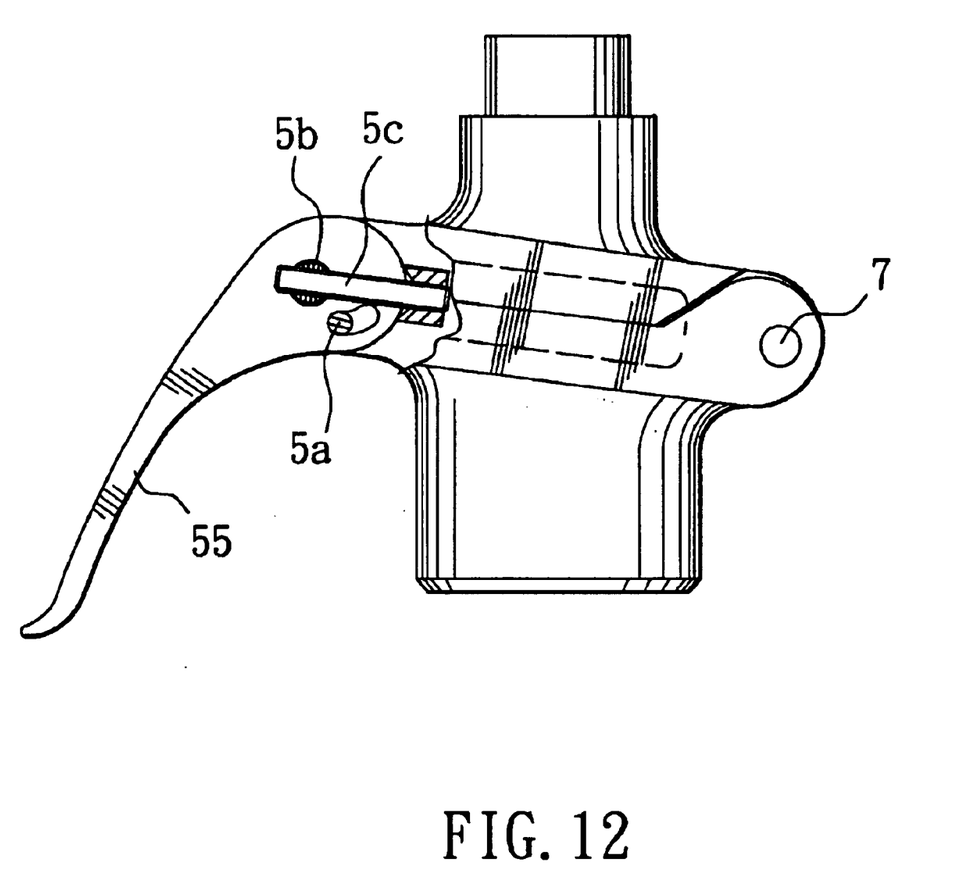
FIG. 12 is a structure schematic drawing of a fifth embodiment according to the present invention.

Please refer to FIG. 11 and FIG. 12. In the fifth embodiment, the lever 55 of the braking mechanism 5c utilizes a rotating pin 71 to eccentrically articulate with respect to an edge of the base plate 2 in opposition to the hinge shaft 7. An auto-rotating shaft pin 5b is placed near the rotating pin 5a, and a pull rod 5c is fixed thereon. An end of the pull rod 5c is connected to the latching block 3. When the lever 55 is pulled, the shaft pin 5b drives the pull rod 5c and latching block 3 to move within the depression 4. As in the above description, the lever 55 can drive the latching block 3 into or out of the groove (not shown in FIG. 11 and FIG. 12). The main purpose of this embodiment is to show that the lever 55 can be on a side that is different from that of the hinge shaft 7 (they are on the same side in the first embodiment), and that the groove can be placed on the same side as the hinge shaft 7 (the grooves 6a, 6b are on opposite sides of the hinge shaft 7 in the first embodiment).

The invention has been described using exemplary preferred embodiments. However, for those skilled in this field the preferred embodiments can be easily adapted and modified to suit additional applications without departing from the spirit and scope of this invention. Thus, it is to be understood that the scope of the invention is not limited to the disclosed embodiments. On the contrary, it is intended to cover various modifications and similar arrangements based upon the same operating principles. The scope of the claims, therefore, should be accorded the broadest interpretations so as to encompass all such modifications and similar arrangements.

Although the present invention has been explained in relation to its preferred embodiment, it is to be understood that many other possible modifications and variations can be made without departing from the spirit and scope of the invention as hereinafter claimed.

What is claimed is:

1. An inner-lock foldable joint comprising:

two base plates rotatably connected by a hinge, each base plate having a depression;

at least one groove disposed along an edge of one of the depressions;

at least one latching block moveably mounted in one of the depressions;

a braking mechanism attached to the latching block for driving the latching block into or out of the groove; wherein when the latching block moves into the groove, the two base plates are in a latched state, and the latching block is not in the groove, the two base plates are in an unlatched state; and wherein a groove is placed on two sides of the depression within the base plate, and the braking mechanism has one latching block capable of moving along the groove.

2. The inner-lock foldable joint as claimed in claim 1 wherein the latching block has two flanges which are of a matched shape with the groove.

3. The inner-lock foldable joint as claimed in claim 1 wherein the groove is placed on an opposite side from the hinge.

4. The inner-lock foldable joint as claimed in claim 1 wherein the groove is placed on the same side of the hinge.

5. The inner-lock foldable joint as claimed in claim 1 wherein at least one groove is placed on two sides of the depression within the base plate, and the braking mechanism has two slidable latching blocks.

6. The inner-lock foldable joint as claimed in claim 1 wherein the braking mechanism further comprises:

a lever;

an eccentric wheel connected to one end of the lever;

a push rod, one end of the push rod connected to the latching block and another end abutting the eccentric wheel;

a stop plate fixed within the depression; and a reposition spring placed on the push bar between the stop plate and the eccentric wheel;

wherein the eccentric wheel is capable of pushing the push rod to move towards the groove so that the two base plates are in the latched state, and when the eccentric wheel moves away from the push rod, the reposition spring pulls back the push rod so that the latching block separates from the groove and the two base plates are in the unlatched state.

* * * * *